ated Nov. 29, 1966

3,288,749
STABILIZATION OF RUBBER WITH A MIXTURE OF PHENYLENE DIAMINES AND DIAMINODIPHENYL ETHERS OR THIOETHERS
William L. Cox, Cuyahoga Falls, Ohio, assignor to Universal Oil Products Company, Des Plaines, Ill., a corporation of Delaware
No Drawing. Filed Sept. 16, 1965, Ser. No. 487,910
15 Claims. (Cl. 260—45.9)

This application is a continuation-in-part of copending application Serial No. 95,806, filed March 15, 1961, now abandoned and relates to the stabilization of rubber by incorporating therein a novel synergistic mixture, and to the synergistic mixture as a novel composition.

As is now well known, rubber undergoes cracking due to attack by ozone in the atmosphere. In addition, rubber undergoes deterioration due to oxygen in the atmosphere. It has been well established at the present time that the deterioration caused by ozone and the deterioration caused by oxygen are different and that both types of deterioration will occur when both ozone and oxygen are present.

The novel synergistic mixture of the present invention serves to prevent cracking of the rubber due to ozone to a greater extent than is obtained through the use of either of the components of the mixture separately. In addition, the synergistic mixture also serves to retard deterioration of the rubber due to oxidation.

Preferred antiozonants for rubber comprise p-phenylene diamines. A particularly preferred antiozonant comprises an N,N'-di-sec-alkyl-p-phenylene diamine in which the alkyl group contains at least 8 carbon atoms. Particularly effective antiozonants comprise N,N'-di-sec-octyl-p-phenylene diamine and N,N'-di-sec-nonyl-p-phenylene diamine. The preferred antiozonants contain from 8 to 12 carbon atoms in each alkyl group and thus also include N,N'-di-sec-decyl-p-phenylene diamine, N,N'-di-sec-undecyl-p-phenylene diamine and N,N'-di-sec-dodecyl-p-phenylene diamine. In some cases the alkyl groups each may contain up to 20 carbon atoms or more and thus will include N,N'-di-sec-tridecyl-p-phenylene diamine, N,N'-di-sec-tetradecyl-p-phenylene diamine, N,N'-di-sec-pentadecyl-p-phenylene diamine, N,N'-di-sec-hexadecyl-p-phenylene diamine, N,N'-di-sec-heptadecyl-p-phenylene diamine, N,N'-di-sec-octadecyl-p-phenylene diamine, N,N'-di-sec-nonadecyl-p-phenylene diamine, N,N'-di-sec-eicosyl-p-phenylene diamine, etc. While these antiozonants are extremely effective, it is of course desirable to further increase their effectiveness.

In another embodiment the antiozonant comprises an N,N'-di-sec-alkyl-p-phenylene diamine in which the alkyl groups each contains 6 or 7 carbon atoms. The antiozonants in this embodiment accordingly comprise N,N'-di-sec-hexyl-p-phenylene diamine and N,N'-di-sec-heptyl-p-phenylene diamine.

Other phenylene diamine antiozonants include N,N'-dicycloalkyl-p-phenylene diamine and particularly N,N'-di-cyclohexyl-p-phenylene diamine. Still other phenylene diamine antiozonants comprise N-alkyl-N'-phenyl-p-phenylene diamines including N-isopropyl-N'-phenyl-p-phenylene diamine, N-sec-butyl-N'-phenyl-p-phenylene diamine, N-sec-pentyl-N'-phenyl-p-phenylene diamine, N-sec-hexyl-N'-phenyl-p-phenylene diamine, N-sec-heptyl-N'-phenyl-p-phenylene diamine, N-sec-octyl-N'-phenyl-p-phenylene diamine, N-sec-nonyl-N'-phenyl-p-phenylene diamine, N-sec-decyl-N'-phenyl-p-phenylene diamine, N-sec-undecyl-N'-phenyl-p-phenylene diamine, N-sec-dodecyl-N'-phenyl-p-phenylene diamine, etc. Still another antiozonant comprises N,N'-di-phenyl-p-phenylene diamine.

Surprisingly, it has been found that certain compounds which possess antioxidant properties also produce a synergistic effect when used in combination with the antiozonants hereinbefore set forth. As will be shown by the examples appended to the present specifications, these additional compounds in themselves do not possess antiozonant properties. Therefore, it is surprising that they should increase the antiozonant properties of the antiozonants hereinbefore set forth.

These additional compounds are antioxidants and therefore will contribute antioxidant properties to the rubber, in addition to their synergistic effect in enhancing the antiozonant properties of the p-phenylene diamine compounds hereinbefore set forth.

The compounds contributing to the synergistic effect are diaminodiphenyl ethers and sulfides. While the unsubstituted diaminodiphenyl compounds may be employed, it generally is preferable to utilize the bis-alkyl derivatives thereof. In a preferred embodiment the bis-alkyl substituents are in the 4,4'-positions although, in some cases, they may be in the 2,4'-positions, or mixtures of the 4,4'- and/or 2,4'-substituted compounds may be employed.

A preferred bis-alkylaminodiphenyl ether is bis-4,4'-sec-butyl-aminodiphenyl ether. Other bis-alkylaminodiphenyl ethers include bis-4,4'-isopropyl-aminodiphenyl ether, bis-4,4'-sec-pentyl-aminodiphenyl ether, bis-4,4'-sec-hexyl-aminodiphenyl ether, bis-4,4'-sec-heptyl-aminodiphenyl ether, bis-4,4'-sec-octyl-aminodiphenyl ether, bis-4,4' - sec-nonyl-aminodiphenyl ether, bis-4,4'-sec-decyl-aminodiphenyl ether, bis-4,4'-sec-undecyl-aminodiphenyl ether, bis-4,4'-sec-dodecyl-aminodiphenyl ether, bis-4,4'-sec-tridecyl-aminodiphenyl ether, bis-4,4'-sec-tetradecyl-aminodiphenyl ether, bis - 4,4' - sec-pentadecyl-aminodiphenyl ether, bis-4,4'-sec-hexadecyl-aminodiphenyl ether, bis-4,4'-sec-heptadecyl-aminodiphenyl ether, bis-4,4'-sec-octadecyl - aminodiphenyl ether, bis-4,4'-sec-nonadecyl-aminodiphenyl ether, bis-4,4'-sec-eicosyl-aminodiphenyl ether, etc. As hereinbefore set forth, the corresponding 2,4'-di-substituted compounds may be employed, as well as mixtures of the 4,4'- and/or 2,4'-di-substituted compounds.

A preferred bis-alkylaminodiphenyl sulfide is bis-4,4'-sec-butyl-aminodiphenyl sulfide. Other bis-alkylaminodiphenyl sulfides include bis-4,4'-isopropyl-aminodiphenyl sulfide, bis-4,4'-sec-pentyl-aminodiphenyl sulfide, bis-4,4'-sec-hexyl-aminodiphenyl sulfide, bis-4,4'-sec-heptyl-aminodiphenyl sulfide, bis,4,4'-sec-octyl-aminodiphenyl sulfide, bis - 4,4' - sec-nonyl-aminodiphenyl sulfide, bis-4,4'-sec-decyl-aminodiphenyl sulfide, bis-4,4'-sec-undecyl-aminodiphenyl sulfide, bis-4,4'-sec-dodecyl-aminodiphenyl sulfide, bis - 4,4' - sec-tridecyl-aminodiphenyl sulfide, bis-4,4-sec-tetradecyl-aminodiphenyl sulfide, bis-4,4'-sec-pentyldecyl-aminodiphenyl sulfide, bis - 4,4' - sec-hexadecyl-aminodiphenyl sulfide, bis-4,4'-sec-heptadecyl-aminodiphenyl sulfide, bis-4,4'-sec-octadecyl-aminodiphenyl sulfide, bis-4,4'-sec-nonadecyl-aminodiphenyl sulfide, bis-4,4'-sec-eicosyl-aminodiphenyl sulfide, etc.

As hereinbefore set forth, the corresponding 2,4'-di-substituted compounds may be employed, as well as mixtures of the 4,4'- and/or 2,4'-di-substituted compounds.

As hereinbefore set forth, the bis-4,4'- and/or 2,4'-di-sec-alkyl-aminodiphenyl ethers and sulfides are preferred. It is understood that in some cases, the alkyl substituents may be of normal or tertiary configuration and that the phenyl ring or rings may contain other substituents attached thereto and preferably hydrocarbon substituents including alkyl, cycloalkyl, aryl, aralkyl, alkaryl, etc. However, these different compounds are not necessarily equivalent in their synergistic effect, but all of them will serve to enhance the antiozonant properties of the antiozonants hereinbefore set forth.

From the above discussion, it will be seen that the present invention provides a novel synergistic mixture of a p-phenylene diamine antiozonant and a diaminodiphenyl compound selected from the group consisting of diaminodiphenyl ether and diaminodiphenyl sulfide.

In another embodiment the present invention relates to a method of stabilizing rubber against cracking due to ozone which comprises incorporating therein an antiozonant mixture of an N,N'-di-sec-alkyl-p-phenylene diamine and the diaminodiphenyl compound in synergistic proportions.

As hereinbefore set forth, the components are used in synergistic proportions. In one embodiment these may comprise from about 5 to about 95% of one component and from about 95% to about 5% of the other component. In most cases it is preferred to utilize these components in concentrations of from about 25 to about 75% of one component and from about 75 to about 25% of the other component. In a particularly preferred embodiment, the p-phenylenediamine antiozonant comprises from about 50% to about 90% and the diaminodiphenyl compound comprises from about 50% to about 10% by weight of the synergistic mixture.

The synergistic composition of the present invention is used in rubber in a concentration sufficient to effect the desired stabilization. The concentration may range from about 0.5% to about 5% and more particularly from about 1.5% to about 3% by weight of the rubber, although, in some cases higher or lower concentrations may be employed. These concentrations are based on the rubber hydrocarbon exclusive of the other components of the rubber composition and are used in this manner in the present specifications and claims. When desired, the synergistic mixture may be used along with an additional antioxidant and also is used along with other additives incorporated in rubber for specific purposes including accelerators, softeners, extenders, wax, reinforcing agents, etc.

When used along with an additional antioxidant, it is understood that any suitable antioxidant may be employed including, for example, phenyl-beta-naphthylamine, 6-phenyl-2,2,4-trimethyl-1,2-dihydroquinoline, marketed under the trade name of "Santoflex-B" 2,2'-methylene-bis(4-methyl-6-tert-butyl-phenol), 2,6-di-tert-butyl-p-cresol, the reaction product of acetone and diphenylamine, marketed under the trade name of "B.L.E," etc. These antioxidants generally are used in a concentration of from about 0.5% to about 3% by weight of the rubber.

When desired, the synergistic mixture of the present invention also is used along with paraffin and/or microcrystalline wax. The wax generally is utilized in a concentration of from 0.5% to 3.0% by weight of the rubber.

In one embodiment the synergistic mixture of the present invention is admixed with the antioxidant, wax and/or other additives, and the mixture then is composited with one or more of the other components of the rubber composition. In a preferred embodiment the synergistic mixture is incorporated in the latex prior to milling. In still another embodiment vulcanized rubber may be soaked, dipped or suspended in the synergistic mixture to apply a surface coating to the rubber, or the synergistic mixture may be sprayed, poured, or otherwise contacted with the previously vulcanized rubber.

The synergistic mixture of the present invention is utilized in any rubber composition subject to ozone cracking, including those used for automobile and truck tires and tubes, hose, belting, sheet and tread rubber, rubberized fabrics, molded goods, boots and shoes, etc., whether vulcanized in a mold, in open steam, in hot air, or in the cold by the so-called acid process. In another embodiment, the present invention can be utilized for the stabilization of adhesives, elastomers, etc., which tend to crack due to ozone.

When the synergistic mixture is added to a liquid such as rubber pigment or an oil, it is dissolved therein in the desired proportions. When the synergistic mixture is added to a solid substrate, it is incorporated therein by milling, mastication, etc. The synergistic mixture may be utilized as such or as a solution or dispersion or as powder paste, etc.

In general, rubber is classified as a vulcanizable diene hydrocarbon rubber and comprises polymers of conjugated 1,3-dienes either as polymers thereof or as copolymers thereof with other polymerizable compounds. In one embodiment the rubber is a synthetic rubber including, for example, butadiene-styrene copolymer rubber presently referred to in the art as SBR rubber, Buna-N rubber produced from butadiene and acrylonitrile, butyl rubber produced from butadiene and isobutylene, neoprene, etc. The natural rubbers includes Hevea rubber, cauotchouc, balata, gutta-percha, etc. It is understood that the term rubber as used in the present specifications and claims is intended to include both synthetic rubber and natural rubber which undergo cracking due to ozone.

The following examples are introduced to illustrate further the novelty and utility of the present invention but not with the intention of unduly limiting the same.

EXAMPLE I

The base rubber used in this and some of the following examples had the following recipe.

*Table I*

| Ingredient: | Parts by weight |
| --- | --- |
| SBR-1502 | 100 |
| Furnace black | 40 |
| Circosol 2XH (oil) | 10 |
| Zinc oxide | 3 |
| Stearic acid | 2 |
| Sulfur | 2 |
| Accelerator [1] | 1.25 |

[1] N-cyclohexyl-2-benzothiazole-sulfenamide.

A sample of rubber of the above recipe was used as the blank or control sample. Various combinations of additives were incorporated to other samples of the rubber during milling, as will be specifically set forth below. All of the samples were formed into strips 6" long, 0.75" wide and 0.080" thick and cured individually for 40 minutes at 104° C. The different samples were elongated 10% or 20% and evaluated in an ozone cabinet at 100° F. in an atmosphere containing 50 parts of ozone per 100 million parts of air. The time to first visible cracks was determined and is reported in the following examples.

Prior to being placed in the ozone cabinet the samples were stored in the office for 72 hours. The reason for this is that preparation of the samples was completed on a Friday and the runs in the ozone cabinet were not made until the following Monday. The atmosphere in the office contained a very slight amount of ozone and a number of the samples underwent cracking during this time.

The blank or control sample of the above recipe, but not containing an additive, underwent cracking while stored in the office as described above and therefore was not run in the ozone cabinet. Similarly, all of the samples which contained either 1 or 2% by weight of the different diaminodiphenyl compounds but not containing the antiozonant also underwent cracking during such storage and accordingly were not run in the ozone cabinet.

EXAMPLE II

The antiozonant used in this example was N,N'-di-3-(5-methylheptyl)-p-phenylenediamine. The synergistic compound was bis-4,4'-sec-butyl-aminodiphenyl ether. The results of runs in the ozone cabinet with samples containing a variety of combinations are reported in the following table. In the interest of simplicity, N,N'-di-3-(5 - methylheptyl) - p - phenylenediamine is abbreviated DMHPPD, and bis-4,4'-sec-butyl-aminodiphenyl ether is abbreviated SBADE.

*Table II*

| Run No. | Additive | Concentration (Parts by Wt.) | Hours to First Crack, Elongation | |
|---|---|---|---|---|
| | | | 10% | 20% |
| 1 | None | | Cracked in Storage | |
| 2 | SBADE [1] | 1 | Cracked in Storage | |
| 3 | SBADE [1] | 2 | Cracked in Storage | |
| 4 | DMHPPD [2] | 2 | ~36 | ~3 |
| 5 | DMHPPD [2] plus SBADE [1] | 2 1 | >168 | >168 |

[1] Bis-4,4'-sec-butyl-aminodiphenyl ether.
[2] N,N'-di-3-(5-methylheptyl)-p-phenylene diamine.

From the data in the above table it will be seen that the sample which contained both DMHPPD and SBADE (run 5) was crack free for >168 hours. As mentioned before, this is surprising because SBADE in itself was not an antiozonant as indicated by runs 2 and 3.

EXAMPLE III

Another series of runs similar to those described in Example II was made except that the diaminodiphenyl compound was bis-4,4'-sec-butyl-aminodiphenyl sulfide which, in the interest of simplicity, is abbreviated SBADS.

*Table III*

| Run No. | Additive | Concentration (Parts by Wt.) | Hours to First Crack, Elongation | |
|---|---|---|---|---|
| | | | 10% | 20% |
| 6 | None | | Cracked in Storage | |
| 7 | SBADS [1] | 1 | Cracked in Storage | |
| 8 | SBADS [1] | 2 | Cracked in Storage | |
| 9 | DMHPPD [2] | 2 | 36 | 3 |
| 10 | DMHPPD [2] plus SBADS [1] | 2 1 | 168 | 168 |

[1] Bis-4,4'-sec-butyl-aminodiphenyl sulfide.
[2] N,N'-dis-3-(5-methylheptyl)-p-phenylene diamine.

Here again it will be noted that the combination of both DMHPPD and SBADS (run 10) served as a synergistic mixture to impart high antiozonant properties. As hereinbefore set forth, the fact that SBADS functions in this manner is surprising because by itself it possesses no antiozonant properties as demonstrated in runs 7 and 8.

EXAMPLE IV

A sample of the rubber described above containing 1.5 parts by weight of N,N'-di-3-(5-methylheptyl)-p-phenylene diamine, when evaluated in the ozone cabinet, showed visible cracks in about 2 hours in the samples elongated 10%. On the other hand another sample of the rubber containing both 1.5 parts by weight of N,N'-di-3-(5-methylheptyl)-p-phenylene diamine and 2 parts by weight of bis-4,4'-sec-butyl-aminodiphenyl sulfide, when evaluated in the ozone cabinet, did not show visible cracks after 165 hours in the sample elongated 10%.

EXAMPLE V

The synergistic mixture of this example comprises 80% by weight of N,N'-di-2-octyl-p-phenylene diamine and 20% by weight of bis-2,4'-isopropyl-aminodiphenyl ether. The synergistic mixture described above is incorporated in a concentration of 2.5% by weight in a natural rubber composition of the following recipe.

*Table IV*

| Ingredients: | Parts by weight |
|---|---|
| Smoked sheet | 100 |
| Carbon black | 45 |
| Zinc oxide | 3 |
| Stearic acid | 3 |
| Sulfur | 2.5 |
| Accelerator [1] | 1.8 |

[1] N-cyclohexyl-2-benzothiazole-sulfenamide.

The ingredients are milled in the conventional manner and the composition then is cured for 40 minutes at 140° C.

EXAMPLE VI

The synergistic mixture of this example comprises 60% by weight of N,N'-di-sec-nonyl-p-phenylene diamine and 40% by weight of bis-4,4'-di-sec-octyl-aminodiphenyl sulfide. The synergistic mixture is incorporated in a concentration of 2.5% by weight in another sample of the rubber having the base formula set forth in Example I.

EXAMPLE VII

The synergistic mixture of this example comprises 70% by weight of N,N'-di-cyclohexyl-p-phenylene diamine and 30% by weight of bis-4,4'-di-sec-butyl-aminodiphenyl ether. The synergistic mixture is incorporated in a concentration of 3% by weight in a rubber having the base formula set forth in Example I.

EXAMPLE VIII

The synergistic mixture of this example is composed of 75% by weight of N-isopropyl-N'-phenyl-p-phenylene diamine and 25% by weight of bis-4,4'-di-isopropyl-aminodiphenyl sulfide. The synergistic mixture is incorporated in a concentration of 2.5% by weight in another sample of the rubber having the base formula set forth in Example V.

EXAMPLE IX

The synergistic mixture of this example comprises 65% by weight of N-sec-octyl-N'-phenyl-p-phenylene diamine and 35% by weight of bis-4,4'-sec-butyl-aminodiphenyl ether. The synergistic mixture is incorporated in a concentration of 3% by weight in another sample of the rubber having the base formula set forth in Example I.

EXAMPLE X

The synergistic mixture of the example is composed of 80% by weight of N,N'-di-sec-hexyl-p-phenylene diamine and 20% by weight of bis-4,4'-sec-butyl-aminodiphenyl ether. The synergistic mixture is incorporated in a concentration of 3% by weight in a rubber having the basic formula set forth in Example I.

EXAMPLE XI

The synergistic mixture of this example comprises 70% by weight of N,N'-di-sec-heptyl-p-phenylene diamine and 30% by weight of bis-4,4'-sec-butyl-diaminodiphenyl sulfide. The synergistic mixture is incorporated in a concentration of 3% by weight in another sample of the rubber having the basic formula set forth in Example V.

I claim as my invention:
1. A mixture of from about 50% to about 90% by weight of an N,N'-di-sec-alkyl-p-phenylene diamine in which each of the alkyl groups contains from 6 to 12 carbon atoms and from about 50% to about 10% by weight of a diaminodiphenyl compound selected from the group consisting of bis-4,4'-sec-alkyl-aminodiphenyl ether and bis-4,4'-sec-alkyl-aminodiphenyl sulfide, each alkyl group of said diaminodiphenyl compound containing from 3 to 20 carbon atoms.
2. A mixture of from about 50% to about 90% by weight of an N,N'-di-sec-octyl-p-phenylene diamine and from about 50% to about 10% by weight of a diaminodiphenyl compound selected from the group consisting of bis-4,4'-sec-butyl-aminodiphenyl ether and bis-4,4'-sec-butyl-aminodiphenyl sulfide.

3. A mixture of from about 50% to about 90% by weight of an N,N'-di-3-(5-methylheptyl)-p-phenylene diamine and from about 50% to about 10% by weight of a diaminodiphenyl compound selected from the group consisting of bis-4,4'-sec-butyl-aminodiphenyl ether and bis-4,4'-sec-butyl-aminodiphenyl sulfide.

4. A mixture of from about 50% to about 90% by weight of N,N'-di-3-(5-methylheptyl)-p-phenylene diamine and from about 50% to about 10% by weight of bis-4,4'-sec-butyl-aminodiphenyl ether.

5. A mixture of from about 50% to about 90% by weight of N,N'-di-3-(5-methylheptyl)-p-phenylene diamine and from about 50% to about 10% by weight of bis-4,4'-sec-butyl-aminodiphenyl sulfide.

6. Vulcanizable diene hydrocarbon rubber normally subject to cracking due to ozone containing a stabilizing concentration of a mixture of from about 50% to about 90% by weight of an N,N'-di-sec-alkyl-p-phenylene diamine in which each of the alkyl groups contains from 8 to 12 carbon atoms and from about 50% to about 10% by weight of a diaminodiphenyl compound selected from the group consisting of bis-sec-alkylamino diphenyl ether and bis-sec-alkyl-aminodiphenyl sulfide, each alkyl group of said diaminodiphenyl compound containing from 3 to 20 carbon atoms.

7. Vulcanizable diene hydrocarbon rubber normally subject to cracking due to ozone containing a stabilizing concentration of a mixture of from about 50% to about 90% by weight of an N,N'-di-sec-alkyl-p-phenylene diamine in which each of the alkyl groups contains from 6 to 12 carbon atoms and from about 50% to about 10% by weight of a diaminodiphenyl compound selected from the group consisting of bis-4,4'-sec-alkyl-aminodiphenyl ether and bis-4,4'-sec-alkyl-aminodiphenyl sulfide, each alkyl group of said diaminodiphenyl compound containing from 3 to 20 carbon atoms.

8. Vulcanizable diene hydrocarbon rubber normally subject to cracking due to ozone containing a stabilizing concentration of a mixture of from about 50% to about 90% by weight of an N,N'-di-sec-octyl-p-phenylene diamine and from about 50% to about 10% by weight of a diaminodiphenyl compound selected from the group consisting of bis-4,4'-sec-butyl-aminodiphenyl ether and bis-4,4'-sec-butyl-aminodiphenyl sulfide.

9. Vulcanizable diene hydrocarbon rubber normally subject to cracking due to ozone containing a stabilizing concentration of a mixture of from about 50% to about 90% by weight of an N,N'-di-3-(5-methylheptyl)-p-phenylene diamine and from about 50% to about 10% by weight of a diaminodiphenyl compound selected from the group consisting of bis-4,4'-sec-butyl-aminodiphenyl ether and bis-4,4'-sec-butyl-aminodiphenyl sulfide.

10. Vulcanizable diene hydrocarbon rubber normally subject to cracking due to ozone containing a stabilizing concentration of a mixture of from about 50% to about 90% by weight of N,N'-di-3-(5-methylheptyl)-p-phenylene diamine and from about 50% to about 10% by weight of bis-4,4'-sec-butyl-aminodiphenyl ether.

11. Vulcanizable diene hydrocarbon rubber normally subject to cracking due to ozone containing a stabilizing concentration of a mixture of from about 50% to about 90% by weight of N,N'-di-3-(5-methylheptyl)-p-phenylene diamine and from about 50% to about 10% by weight of bis-4,4'-sec-butyl-aminodiphenyl sulfide.

12. A mixture as defined in claim 1 further characterized in that said diaminodiphenyl compound is bis-4,4'-sec-butyl-aminodiphenyl ether.

13. A mixture as defined in claim 1 further characterized in that said diaminodiphenyl compound is bis-4,4'-sec-butyl-aminodiphenyl sulfide.

14. A composition as defined in claim 6 further characterized in that said diaminodiphenyl compound is bis-4,4'-sec-butyl-aminodiphenyl ether.

15. A composition as defined in claim 6 further characterized in that said diaminodiphenyl compound is bis-4,4'-sec-butyl-aminodiphenyl sulfide.

References Cited by the Examiner

UNITED STATES PATENTS

| | | | |
|---|---|---|---|
| 1,815,072 | 7/1931 | Reed | 260—808 |
| 2,097,473 | 11/1937 | Simon | 260—808 |
| 2,128,944 | 9/1938 | Jones | 260—45.9 |
| 2,902,466 | 10/1959 | Rosenwald et al. | 260—45.9 |
| 3,126,412 | 3/1964 | Stahly | 260—45.9 |
| 3,156,728 | 11/1964 | Orloff et al. | 260—45.9 |

FOREIGN PATENTS 356,923  10/1931  Great Britain.

LEON J. BERCOVITZ, *Primary Examiner.*

H. E. TAYLOR, JR., *Assistant Examiner.*